(12) United States Patent
Lai et al.

(10) Patent No.: US 9,482,788 B2
(45) Date of Patent: Nov. 1, 2016

(54) UV-BLOCKING SILICONE HYDROGEL COMPOSITION AND SILICONE HYDROGEL CONTACT LENS CONTAINING THEREOF

(71) Applicant: PEGAVISION CORPORATION, Guishan Township, Taoyuan County (TW)

(72) Inventors: Yu-Chin Lai, Guishan Township, Taoyuan County (TW); Min-Tzung Yeh, Guishan Township, Taoyuan County (TW); Han-Yi Chang, Guishan Township, Taoyuan County (TW); Heng-Yi Li, Guishan Township, Taoyuan County (TW); Hung-Ju Chang, Guishan Township, Taoyuan County (TW); Che-Cheng Wu, Guishan Township, Taoyuan County (TW)

(73) Assignee: PEGAVISION CORPORATION, Guishan Township, Taoyuan County (TW)

(*) Notice: Subject to any disclaimer, the term of this patent is extended or adjusted under 35 U.S.C. 154(b) by 0 days.

(21) Appl. No.: 14/561,312

(22) Filed: Dec. 5, 2014

(65) Prior Publication Data
US 2016/0161638 A1  Jun. 9, 2016

(51) Int. Cl.
*C08F 238/04* (2006.01)
*G02B 1/04* (2006.01)
*C08G 77/14* (2006.01)
*C08G 77/26* (2006.01)
*C08F 230/08* (2006.01)

(52) U.S. Cl.
CPC ............... *G02B 1/043* (2013.01); *C08G 77/14* (2013.01); *C08G 77/26* (2013.01); *C08F 230/08* (2013.01)

(58) Field of Classification Search
CPC .................................................. C08F 230/08
See application file for complete search history.

(56) References Cited

U.S. PATENT DOCUMENTS

| | | |
|---|---|---|
| 4,528,311 A | 7/1985 | Beard et al. |
| 4,716,234 A | 12/1987 | Dunks et al. |
| 4,719,248 A | 1/1988 | Bambury et al. |
| 4,803,254 A | 2/1989 | Dunks et al. |
| 6,359,024 B2 | 3/2002 | Lai |
| 6,465,538 B2 | 10/2002 | Lai |
| 6,822,016 B2 | 11/2004 | McCabe et al. |
| 7,291,654 B2 | 11/2007 | Ulrich et al. |
| 8,862,925 B2 | 10/2014 | DeMarco |
| 2009/0234089 A1 | 9/2009 | Ueyama et al. |
| 2012/0172478 A1 | 7/2012 | Chang et al. |
| 2012/0216488 A1* | 8/2012 | Liu ......... G02B 1/043 53/425 |
| 2012/0220688 A1 | 8/2012 | Wang et al. |
| 2013/0172592 A1 | 7/2013 | Li et al. |
| 2014/0031449 A1* | 1/2014 | Alli ......... C08F 283/124 523/107 |

FOREIGN PATENT DOCUMENTS

| | | |
|---|---|---|
| EP | 2610282 A1 | 7/2013 |
| JP | 2009-014977 A | 1/2009 |
| JP | 2013-535704 A | 9/2013 |
| JP | 2014-508833 A | 4/2014 |
| JP | 5604501 B2 | 10/2014 |
| RU | 2011123374 A | 12/2012 |
| TW | 201326230 A | 7/2013 |
| TW | 201420678 A | 6/2014 |
| WO | 2008005147 A2 | 1/2008 |
| WO | 2013/096587 A1 | 6/2013 |
| WO | 2013/096594 A1 | 6/2013 |
| WO | 2013/096597 A1 | 6/2013 |

OTHER PUBLICATIONS

Read et al. "Dynamic Contact Angel Analysis of Silicone Hydrogel Contact Lenses." J. of Biomaterials Applications. Mar. 10, 2010. 38th BCLA Clinical Conference and Exhibition, ICC Birmingham UK, Jun. 6-9, 2014 (4 pages).

* cited by examiner

*Primary Examiner* — Margaret Moore
(74) *Attorney, Agent, or Firm* — Merchant & Gould P.C.

(57) ABSTRACT

The present disclosure provides a UV-blocking silicone hydrogel composition including a hydrophilic silicone macromer, a UV-blocking monomer, a first hydrophilic monomer, a crosslinker and a polymerization initiator. The hydrophilic silicone macromer has a general formula: V-L-S-(L'-V')$_x$, wherein V and V' are independently ethylenically-based polymerizable groups, L and L' are independently a covalent bond or a linkage group, S is a siloxane group having a chemical structure such as

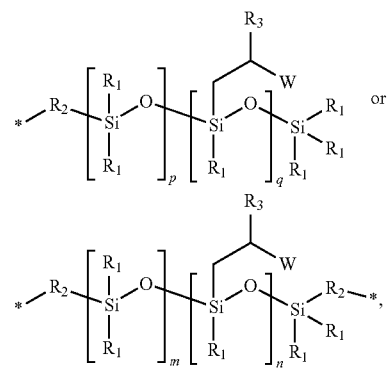

and x is 0 or 1. A silicone contact lens containing the UV-blocking silicone hydrogel composition is also provided herein.

20 Claims, No Drawings

UV-BLOCKING SILICONE HYDROGEL COMPOSITION AND SILICONE HYDROGEL CONTACT LENS CONTAINING THEREOF

BACKGROUND

1. Field of Invention

The present disclosure relates to a silicone hydrogel composition. More particularly, the present disclosure relates to an UV-blocking silicone hydrogel composition and a silicone hydrogel contact lens containing the same.

2. Description of Related Art

Since contact lenses made from silicone hydrogel have high oxygen permeability, and allows sufficient oxygen directly through the lenses to the cornea, thereby providing sufficient oxygen to the cornea. As such, the silicone hydrogel contact lenses may less likely result in corneal hypoxia from lack of oxygen even after a prolonged wearing of contact lenses. Therefore, silicone hydrogel has become one of the preferable components for making contact lenses.

It is well known that sunlight may damage the human eye, especially in connection with the formation of cataracts and age-related macular degeneration which can lead to loss of vision. In the fraction of sunlight, the long wave and near ultraviolet (UVA and UVB) range are most concerned, which are characterized by wavelength of 285-380 nanometers (nm).

This band of ultraviolet radiation is known to damage human eyes by inducing chemical changes in lens and retina. To minimize the damage to eyes, eye protecting optical devices, especially sunglass, has been widely used for a long time. In the technical field of a medical device, a UV blocking compound in an intraocular lens is considered to provide the best UV blocking efficiency. These lenses were usually fabricated by copolymerizing polymerizable UV-blocking monomer with a lens formulation under heating condition. There were many efficient UV blocker monomers claimed useful in incorporated into a lens materials for UV protection especially based on benzotriazole or benzophenone mentioned in U.S. Pat. Nos. 4,528,311; 4,716,234; 4,719,248, 4,803,254.

However, it is difficult to manufacture a silicone hydrogel contact lens having a hydrophilic surface made of a hydrophobic silicon-based material, and it is extremely difficult to manufacture a silicone hydrogel contact lens having a hydrophilic surface made of a hydrophobic silicon-based material and a hydrophobic UV-blocking monomer. Therefore, how to manufacture a silicone hydrogel contact lens having good UV-blocking efficiency and good hydrophilicity is still an issue met in the art.

SUMMARY

In view of the issue met in the art, the present disclosure provides a novel UV-blocking silicone hydrogel composition, and a silicone hydrogel lens made of the silicone hydrogel composition may keep high degree of moisture and high UV-blocking efficiency.

An embodiment of the present disclosure is provided a UV-blocking silicone hydrogel composition including a hydrophilic silicone macromer, an UV-blocking monomer, a first hydrophilic monomer, a crosslinker and a polymerization initiator.

The hydrophilic silicone macromer is in the amount of 25 to 55 weight percentage (wt %) based on the total weight of the silicone hydrogel composition, and has a structure of chemical formula (1):

$$V\text{-}L\text{-}S\text{-}(L'\text{-}V')_x \quad (1)$$

wherein V and V' are individually an ethylenically-based polymerizable group; L and L' are individually a covalent bond or a linker; S is a siloxane group which is

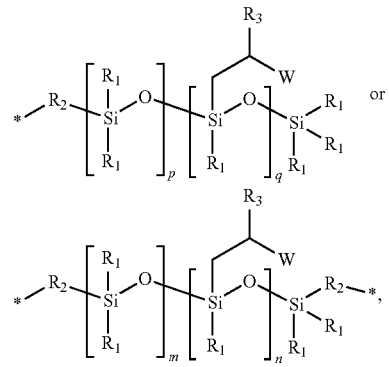

wherein $R_1$ is a C1-C12 alkyl group, $R_2$ is —$(CH_2)_b$—O—$(CH_2)_c$— or a C3-C6 alkyl group, wherein b is an integer of 2-4, and c is an integer of 2-4, $R_3$ is hydrogen or methyl group, W is

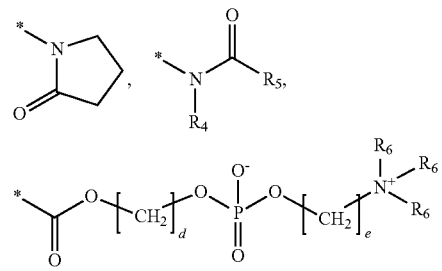

*—$CH_2O(CH_2CH_2O)_f$—$CH_2CH_2OCH_3$, wherein $R_4$ is a C1-C4 alkyl group, $R_5$ is a C1-C2 alkyl group, $R_6$ is a C1-C3 alkyl group, d is an integer of 2-4, e is an integer of 2-4, f is an integer of 1-20, and * is a linkage position of W in the chemical formula (1), p is an integer of 10-50, q is an integer of 0-25, m is an integer of 50-100, and n is an integer of 4-50; and x is 0 or 1.

The UV-blocking monomer is in the amount of 0.5 to 2 wt % based on the total weight of the silicone hydrogel composition. The first hydrophilic monomer is in the amount of 30 to 60 wt % based on the total weight of the silicone hydrogel composition. The crosslinker is in the amount of 0.2 to 2 wt % based on the total weight of the silicone hydrogel composition. The polymerization initiator is in the amount of 0.2 to 1 wt % based on the total weight of the silicone hydrogel composition.

According to various embodiments of the present disclosure, the hydrophilic silicone macromer has a structure of chemical formula (2):

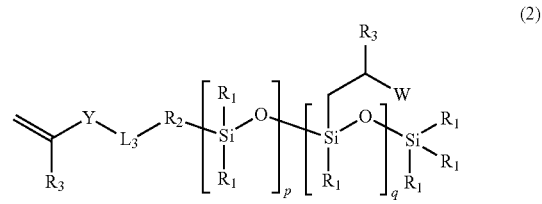

wherein $R_1$ is a C1-C12 alkyl group; $R_2$ is —$(CH_2)_b$—O—$(CH_2)_c$ or a C3-C6 alkyl group, wherein b is an integer of 2-4, and c is an integer of 2-4; $R_3$ is hydrogen or methyl group: W is

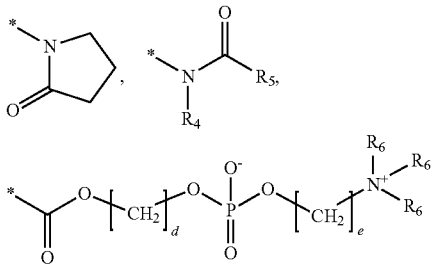

or *—$CH_2O(CH_2CH_2O)_f$—$CH_2CH_2OCH_3$, wherein $R_4$ is a C1-C4 alkyl group, $R_5$ is a C1-C2 alkyl group, $R_6$ is a C1-C3 alkyl group, d is an integer of 2-4, e is an integer of 2-4, f is an integer of 1-20, and * is a linkage position of W in the chemical formula (2); Y is —$(CH_2)_g$— or —$COO(CH_2)_h$, wherein g is an integer of 0-4, and h is an integer of 2-4; $L_3$ is a covalent bond, an amide bond (—CONH—), a carbamate group (—NHCOO—) or an urea group (—NHCONH—), which directly links between Y and $R_2$; and p is an integer of 10-50, and q is an integer of 0-25.

According to various embodiments of the present disclosure, $L_3$ of the chemical formula (2) is a covalent bond directly linking between Y and $R_2$, and q is an integer of 1-25.

According to various embodiments of the present disclosure, the hydrophilic silicone macromer has a structure of chemical (3):

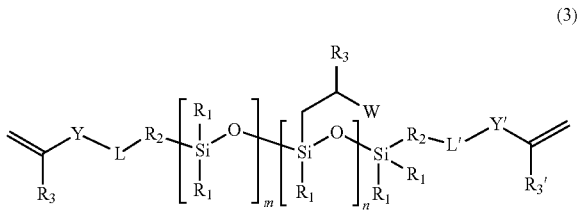

(3)

wherein $R_1$ is a C1-C12 alkyl group; $R_2$ is —$(CH_2)_b$—O—$(CH_2)_c$ or a C3-C6 alkyl group, wherein b is an integer of 2-4, and c is an integer of 2-4; $R_3$ and $R_3'$ are individually hydrogen or methyl group; W is

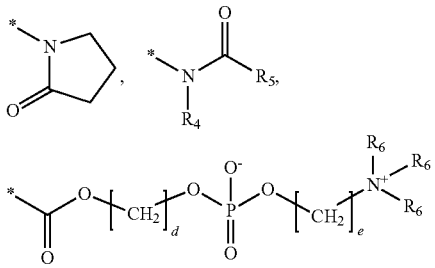

or *—$CH_2O(CH_2CH_2O)_f$—$CH_2CH_2OCH_3$, wherein $R_4$ is a C1-C4 alkyl group, $R_5$ is a C1-C2 alkyl group, $R_6$ is a C1-C3 alkyl group, d is an integer of 2-4, e is an integer of 2-4, f is an integer of 1-20, and * is a linkage position of W in the chemical formula (3); Y and Y' are individually —$(CH_2)_g$— or —$COO(CH_2)_h$, wherein g is an integer of 0-4, and h is an integer of 2-4; L and L' are individually a covalent bond, an amide bond (—CONH—), a carbamate group (—NHCOO—) or an urea group (—NHCONH—), which directly link between $R_2$ and Y, or $R_2$ and Y', respectively; and m is an integer of 50-100, n is an integer of 4-50, and a ratio of m to n is in a range of 2-15.

According to various embodiments of the present disclosure, the ethylenically-based polymerizable group of the hydrophilic silicone macromer is selected from the group consisting of ethylenically-based acrylate, ethylenically-based methacrylate, ethylenically-based acrylamide, ethylenically-based methacrylamide, ethylenically-based styrene, ethylenically-based vinylcarbamate and a combination thereof.

According to various embodiments of the present disclosure, the linker of the hydrophilic silicone macromer has a main chain and a side chain, and the main chain, the side chain or the both include a polar functional group.

According to various embodiments of the present disclosure, the polar functional group of the hydrophilic silicone macromer is selected from the group consisting of hydroxyl, amide, carbamate and urea.

According to various embodiments of the present disclosure, the siloxane group of the hydrophilic silicone macromer has more than 3 silicon atoms and a hydrophilic side chain.

According to various embodiments of the present disclosure, the hydrophilic side chain of the hydrophilic silicone macromer is selected from the group consisting of amide, hydroxyl, polyethylene oxide and a combination thereof.

According to various embodiments of the present disclosure, an average molecular weight of the hydrophilic silicone macromer is in a range of 300-20,000.

According to various embodiments of the present disclosure, the UV-blocking monomer is a benzophenone-based monomer, a benzotriazole-based monomer, a 2-hydroxyphenyl-s-triazine-based monomer or a combination thereof.

According to various embodiments of the present disclosure, the benzophenone-based monomer includes 4-methacryloxy-2-hydroxy benzophenone, 4-(2-acryloxyethoxy-2-hydroxy benzophenone or a combination thereof.

According to various embodiments of the present disclosure, the benzotriazole-based monomer is selected from the group consisting of 2-(2-hydroxy-5-methacryloxyethylphenyl)-2H-benzotriazole, 2-(2-hydroxy-5-methacryloxyethylphenyl)-2H-6-chloro-benzotriazole, 2-(2-hydroxy-5-methacryloxyethylphenyl)-2H-6-methoxybenzotriazole, 2-[3'-t-butyl-5'-(3"-dimethylvinylsilylpropoxy)-2'-hydroxyphenyl]-5-methoxybenzo triazole, 2-[3'-t-butyl-5'-(3"-methacryloylozypropyl)phenyl]-5-chlorobenzotriazole, 2-[2'-hydroxy-5'-(γ-methacryloyloxypropoxy)-3'-tert-butyl phenyl]-5-methoxy-2H-benzotriazole and a combination thereof.

According to various embodiments of the present disclosure, the 2-hydroxyphenyl-s-triazine-based monomer includes 4-methacryloxyethyl-2-hydroxyphenyl-s-triazi ne, 4-acryloxyethyl-2-hydroxyphenyl-s-triazine or a combination thereof.

According to various embodiments of the present disclosure, the first hydrophilic monomer includes N-vinyl pyrrolidone (NVP).

According to various embodiments of the present disclosure, the crosslinker is selected from the group consisting of ethylene glycol dimethacrylate, diethylene glycol dimethacrylate, triethylene glycol dimethacrylate, tetraethylene glycol dimethacrylate, ally dimethacrylate, ethylene glycol dially ether, triethylene glycol dially ether, tetraethylene glycol dially ether, triallyl-s-triazine-2,4,6(1H,3H,5H)-trione and a combination thereof.

According to various embodiments of the present disclosure, the polymerization initiator is a photoinitiator.

According to various embodiments of the present disclosure, the photoinitiator is a phosphine-oxide-based initiator, titanium metallocene-based initiator or a combination thereof.

According to various embodiments of the present disclosure, the phosphine-oxide-based initiator is selected from the group consisting of diphenyl (2,4,6-triphenyl)phosphine oxide, bis(2,4,6-trimethylbenzoyl)phenyl phosphine oxide, bis(2,6-dimethoxylbenzoyl)(2,4,4-trimethylpentyl)phosphine oxide and a combination thereof.

According to various embodiments of the present disclosure, the titanium metallocene-based initiator includes dicyclopentadienyl bis[2,4-difluoro-3-(1-pyrrolyl)phenyl]titanium.

According to various embodiments of the present disclosure, the silicone hydrogel composition further includes a siloxane monomer in the amount of 5 to 25 wt % based on the total weight of the silicone hydrogel composition.

According to various embodiments of the present disclosure, the siloxane monomer includes 3-methacryloxy-2-hydroxy) propyl-bis(trimethyl-siloxy)methylsilane, 3-methacryloxy-2-hydroxypropoxy) propyl-bis(trimethyl-siloxy)methylsilane or a combination thereof.

According to various embodiments of the present disclosure, the silicone hydrogel composition further includes a second hydrophilic monomer in the amount of 5 to 15 wt % based on the total weight of the silicone hydrogel composition.

According to various embodiments of the present disclosure, the second hydrophilic monomer is selected from the group consisting of 2-hydroxyethyl methacrylate, glyceryl methacrylate, methacrylic acid, acrylic acid, N,N-dimethyl acrylamide, N,N-dimethyl methacrylamide, N-vinyl-N-methyl acetamide and a combination thereof.

Another embodiment of the present disclosure is provided a UV-blocking silicone hydrogel contact lens including a contact lens body composed of the aforementioned silicone hydrogel composition.

According to various embodiments of the present disclosure, an UVA (380-316 nm) transmittance of the contact lens body is less than 10%, and an UVB (315-285 nm) transmittance of the contact lens body is less than 1%.

It is to be understood that both the foregoing general description and the following detailed description are by examples, and are intended to provide further explanation of the present disclosure as claimed.

DETAILED DESCRIPTION

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

Due to high oxygen permeability and improved wettability, silicone hydrogel lenses have gained wide acceptance among eye care professional and became popular among consumers as the choice of lens for their vision correction needs. Recently, silicone hydrogel lenses were claimed to occupy 50% of the market. Regardless of its success, silicone hydrogel lenses are still considered difficult to manufacture and there are not that many silicone hydrogel lenses which are considered comfortable to wear. One of the most difficult parts for developing a silicone hydrogel lenses is surface wettability of a silicone-containing hydrogel lens. Due to the hydrophobic property in nature, it is very difficult to get a lens with wettability which is good enough for patient to wear successfully. Poor wetting can trigger substantial lipid-like deposits which not only hurt vision, but also makes lens very uncomfortable to wear.

It is well known that sunlight may damage the human eye, especially in connection with the formation of cataracts and age-related macular degeneration which can lead to loss of vision. In the fraction of sunlight, the long wave and near ultraviolet (UVA and UVB) range are most concerned, which are characterized by wavelength of 285-380 nanometers (nm). This band of ultraviolet radiation is known to damage human eyes by inducing chemical changes in lens and retina. To minimize the damage to eyes, eye protecting optical devices, especially sunglass, has been widely used for a long time. However, few of conventional silicone hydrogel lenses have UV-blocking efficiency. These lenses are usually modified with an UV-blocking monomer having benzophenone group, benzotriazole group or 2-hydroxyphenyl-s-triazine group. The structure of benzophenone, benzotriazole and 2-hydroxyphenyl-s-triazine are shown as chemical formula 1, chemical formula 2 and chemical formula 3:

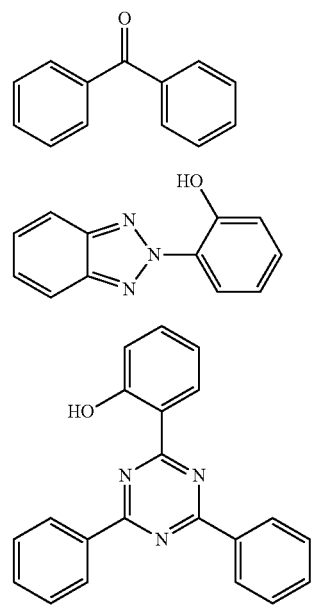

In various embodiments of the present disclosure, a silicone hydrogel composition includes a benzotriazole-based UV-blocking monomer, such as a compound having chemical formula 4, in the amount of 1.5 wt % based on the total weight of the silicone hydrogel composition; N-vinyl pyrrolidone (NVP); a hydrophilic silicone macromer; a proper crosslinker such as ethylene glycol dimethacrylate (EGDMA); and a phosphine-oxide-based initiator. A silicone hydrogel contact lens having high degree of moisture is fabricated under a photo-initiating curing process.

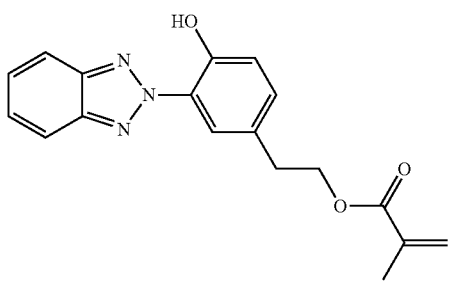

4

In following various embodiments of the present disclosure, the silicone hydrogel composition and the silicone hydrogel contact lens are discussed in detail below, but not limited the scope of the present disclosure. The UV-blocking silicone hydrogel composition includes a hydrophilic silicone macromer, an UV-blocking monomer, a first hydrophilic monomer, a crosslinker and a polymerization initiator.

The hydrophilic silicone macromer is in the amount of 25 to 55 weight percentage (wt %) based on the total weight of the silicone hydrogel composition, and has a structure of chemical formula (1):

(1)

In the chemical formula (1), V and V' are individually an ethylenically-based polymerizable group. According to various embodiments of the present disclosure, the ethylenically-based polymerizable group of the hydrophilic silicone macromer is selected from the group consisting of ethylenically-based acrylate, ethylenically-based methacrylate, ethylenically-based acrylamide, ethylenically-based methacrylamide, ethylenically-based styrene, ethylenically-based vinylcarbamate and a combination thereof. According to various embodiments of the present disclosure, V and V' are the same ethylenically-based polymerizable group or different ethylenically-based polymerizable groups.

In the chemical formula (1), L and L' are individually a covalent bond or a linker. According to various embodiments of the present disclosure, L may be a covalent bond directly linking between V and S. According to various embodiments of the present disclosure, L' may be a covalent bond directly linking between V' and S. According to various embodiments of the present disclosure, the linker of the hydrophilic silicone macromer has a main chain and a side chain, and the main chain, the side chain or the both include a polar functional group. According to various embodiments of the present disclosure, the polar functional group of the hydrophilic silicone macromer is selected from the group consisting of hydroxyl, amide, carbamate and urea.

In the chemical formula (1), S is a siloxane group. According to various embodiments of the present disclosure, the siloxane group of the hydrophilic silicone macromer has more than 3 silicon atoms and a hydrophilic side chain. According to various embodiments of the present disclosure, the hydrophilic side chain of the hydrophilic silicone macromer is selected from the group consisting of amide, hydroxyl, polyethylene oxide and a combination thereof.

According to various embodiments of the present disclosure, the siloxane group is

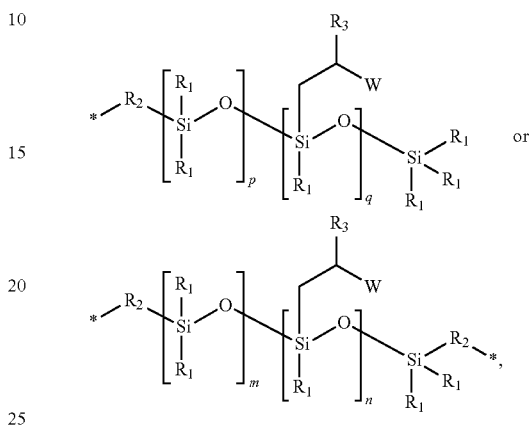

wherein $R_1$ is a C1-C12 alkyl group, $R_2$ is —$(CH_2)_b$—O—$(CH_2)_c$— or a C3-C6 alkyl group, wherein b is an integer of 2-4, and c is an integer of 2-4, $R_3$ is hydrogen or methyl group, W is

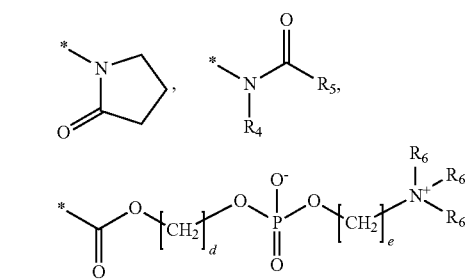

or *—$CH_2O(CH_2CH_2O)_f$—$CH_2CH_2OCH_3$, wherein $R_4$ is a C1-C4 alkyl group, $R_5$ is a C1-C2 alkyl group, $R_6$ is a C1-C3 alkyl group, d is an integer of 2-4, e is an integer of 2-4, f is an integer of 1-20, and * is a linkage position of W in the chemical formula (1), p is an integer of 10-50, q is an integer of 0-25, m is an integer of 50-100, and n is an integer of 4-50.

In the chemical formula (1), x is 0 or 1. According to various embodiments of the present disclosure, an average molecular weight of the hydrophilic silicone macromer is in a range of 300-20,000.

According to various embodiments of the present disclosure, the UV-blocking monomer is a benzophenone-based monomer, a benzotriazole-based monomer, a 2-hydroxyphenyl-s-triazine-based monomer or a combination thereof.

According to various embodiments of the present disclosure, the benzophenone-based monomer includes 4-methacryloxy-2-hydroxy benzophenone, 4-(2-acryloxyethoxy-2-hydroxy benzophenone or a combination thereof.

According to various embodiments of the present disclosure, the benzotriazole-based monomer is selected from the group consisting of 2-(2-hydroxy-5-methacryloxyethylphenyl)-2H-benzotriazole, 2-(2-hydroxy-5-methacryloxyethylphenyl)-2H-6-chloro-benzotriazole, 2-(2-hydroxy-5-methacryloxyethylphenyl)-2H-6-methoxybenzotriazole, 2-[3'-t-butyl-5'-(3"-dimethylvinylsilylpropoxy)-2'-hydroxyphenyl]-5-methoxybenzo triazole, 2-[3'-t-butyl-5'-(3"-methacryloylozypropyl)phenyl]-5-chlorobenzotriazole, 2-[2'-hydroxy-5'-(γ-methacryloyloxypropoxy)-3'-tert-butyl-phenyl]-5-methoxy-2H-benzotriazole and a combination thereof.

According to various embodiments of the present disclosure, the 2-hydroxyphenyl-s-triazine-based monomer includes 4-methacryloxyethyl-2-hydroxyphenyl-s-triazine, 4-acryloxyethyl-2-hydroxyphenyl-s-triazine or a combination thereof.

According to various embodiments of the present disclosure, the UV-blocking monomer is in the amount of 0.5 to 2 wt % based on the total weight of the silicone hydrogel composition.

According to various embodiments of the present disclosure, the first hydrophilic monomer includes N-vinyl pyrrolidone (NVP). The first hydrophilic monomer is in the amount of 30 to 60 wt % based on the total weight of the silicone hydrogel composition.

According to various embodiments of the present disclosure, the crosslinker is selected from the group consisting of ethylene glycol dimethacrylate, diethylene glycol dimethacrylate, triethylene glycol dimethacrylate, tetraethylene glycol dimethacrylate, ally dimethacrylate, ethylene glycol dially ether, triethylene glycol dially ether, tetraethylene glycol dially ether, triallyl-s-triazine-2,4,6(1H,3H,5H)-tri-one and a combination thereof. According to various embodiments of the present disclosure, the crosslinker is in the amount of 0.2 to 2 wt % based on the total weight of the silicone hydrogel composition.

According to various embodiments of the present disclosure, the polymerization initiator is a photoinitiator. According to various embodiments of the present disclosure, the photoinitiator is a phosphine-oxide-based initiator, titanium metallocene-based initiator or a combination thereof.

According to various embodiments of the present disclosure, the phosphine-oxide-based initiator is selected from the group consisting of diphenyl (2,4,6-triphenyl)phosphine oxide, bis(2,4,6-trimethylbenzoyl)phenyl phosphine oxide, bis(2,6-dimethoxylbenzoyl)(2,4,4-trimethylpentyl)phosphine oxide and a combination thereof. According to various embodiments of the present disclosure, the product name of the phosphine-oxide-based initiator includes TPO, Ilrgacure-403, Irgacure-819, Irgacure-1700, Irgacure-1800 or the like.

According to various embodiments of the present disclosure, the titanium metallocene-based initiator includes dicyclopentadienyl bis[2,4-difluoro-3-(1-pyrrolyl)phenyl]titanium. According to various embodiments of the present disclosure, the product name of the titanium metallocene-based initiator includes Irgacure-784 or the like. According to various embodiments of the present disclosure, the polymerization initiator is in the amount of 0.2 to 1 wt % based on the total weight of the silicone hydrogel composition.

According to various embodiments of the present disclosure, by irradiating the silicone hydrogel composition by visible light, the photoinitiator is activated, and then the polymerization is performed.

According to various embodiments of the present disclosure, the silicone hydrogel composition further includes a hydrophilic siloxane monomer in the amount of 5 to 25 wt % based on the total weight of the silicone hydrogel composition. According to various embodiments of the present disclosure, the siloxane monomer includes 3-methacryloxy-2-hydroxy) propyl-bis(trimethyl-siloxy) methylsilane shown as chemical formula 5,3-methacryloxy-2-hydroxy-propoxy) propyl-bis(trimethyl-siloxy) methylsilane shown as chemical formula 6 or a combination thereof.

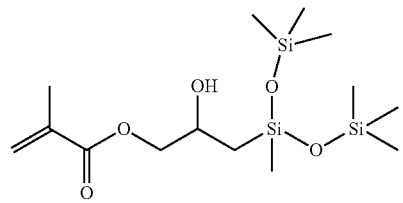

5

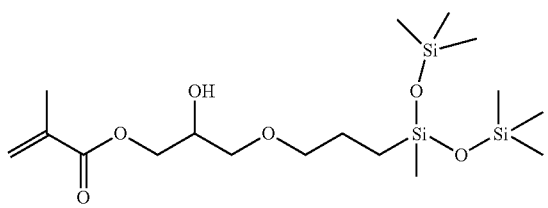

6

According to various embodiments of the present disclosure, the silicone hydrogel composition further includes a second hydrophilic monomer in the amount of 5 to 15 wt % based on the total weight of the silicone hydrogel composition. According to various embodiments of the present disclosure, the second hydrophilic monomer is selected from the group consisting of 2-hydroxyethyl methacrylate, glyceryl methacrylate, methacrylic acid, acrylic acid, N,N-dimethyl acrylamide, N,N-dimethyl methacrylamide, N-vinyl-N-methyl acetamide and a combination thereof.

According to various embodiments of the present disclosure, the first hydrophilic silicone macromer has a structure of chemical formula (2):

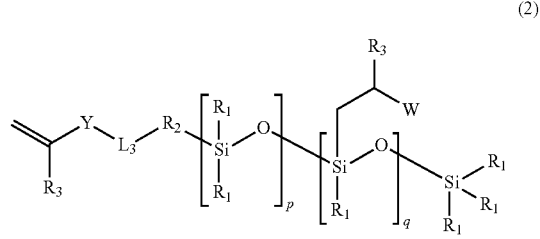

(2)

wherein $R_1$ is a C1-C12 alkyl group; $R_2$ is —$(CH_2)_b$—O—$(CH_2)_c$ or a C3-C6 alkyl group, wherein b is an integer of 2-4, and c is an integer of 2-4; $R_3$ is hydrogen or methyl group; W is

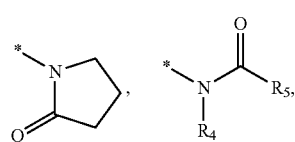

-continued

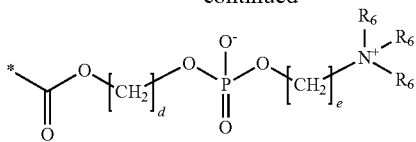

or *—CH$_2$O(CH$_2$CH$_2$O)$_f$—CH$_2$CH$_2$OCH$_3$, wherein R$_4$ is a C1-C4 alkyl group, R$_5$ is a C1-C2 alkyl group, R$_6$ is a C1-C3 alkyl group, d is an integer of 2-4, e is an integer of 2-4, f is an integer of 1-20, and * is a linkage position of W in the chemical formula (2); Y is —(CH$_2$)$_g$— or —COO(CH$_2$)$_h$, wherein g is an integer of 0-4, and h is an integer of 2-4; L$_3$ is a covalent bond, an amide bond (—CONH—), a carbamate group (—NHCOO—) or an urea group (—NHCONH—), which directly links between Y and R$_2$; and p is an integer of 10-50, and q is an integer of 0-25.

According to various embodiments of the present disclosure, L$_3$ of the chemical formula (2) is a covalent bond directly linking between Y and R$_2$, and q is an integer of 1-25.

According to various embodiments of the present disclosure, the second hydrophilic silicone macromer has a structure of chemical formula (3):

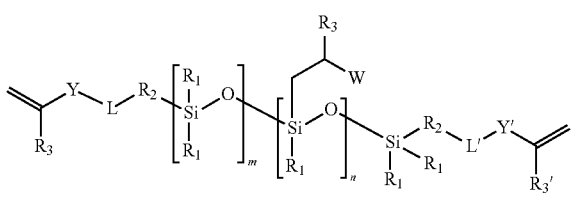

(3)

wherein R$_1$ is a C1-C12 alkyl group; R$_2$ is —(CH$_2$)$_b$—O—(CH$_2$)$_c$ or a C3-C6 alkyl group, wherein b is an integer of 2-4, and c is an integer of 2-4; R$_3$ and R$_3$' are individually hydrogen or methyl group; W is

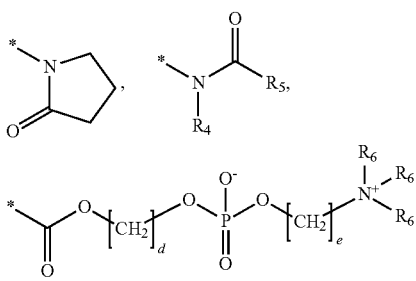

or *—CH$_2$O(CH$_2$CH$_2$O)$_f$—CH$_2$CH$_2$OCH$_3$, wherein R$_4$ is a C1-C4 alkyl group, R$_5$ is a C1-C2 alkyl group, R$_6$ is a C1-C3 alkyl group, d is an integer of 2-4, e is an integer of 2-4, f is an integer of 1-20, and * is a linkage position of W in the chemical formula (3); Y and Y' are individually —(CH$_2$)$_g$— or —COO(CH$_2$)$_h$, wherein g is an integer of 0-4, and h is an integer of 2-4; L and L' are individually a covalent bond, an amide bond (—CONH—), a carbamate group (—NHCOO—) or an urea group (—NHCONH—), which directly link between R$_2$ and Y, or R$_2$ and Y', respectively; and m is an integer of 50-100, n is an integer of 4-50, and a ratio of m to n is in a range of 2-15.

According to various embodiments of the present disclosure, the silicone hydrogel composition may include the first hydrophilic silicone macromer and the second hydrophilic silicone macromer at the same time.

Embodiment 1

Preparation of a Silicone Hydrogel Contact Lens

A reaction mixture was prepared, which includes N-vinyl pyrrolidone (NVP), 2-hydroxyethyl mathacrylate (HEMA), N,N-dimethylanilline (DMA), (3-Methacryloxy-2-hydroxypropoxy) propyl bis(trimethyl-siloxy) methylsilane, the first hydrophilic silicone macromer shown as the chemical formula (2) having an average molecular weight of 1,500, bis(2,4,6-trimethylbenzoyl)-phenylphosphineoxide, ethylene glycol dimethacrylate, triallyl-s-triazine-2,4,6(1H,3H,5H)-trione, and 2(2-hydroxy-5-methacryloxyethylphenyl)-2H-benzotriazole in the amount of 1.5 wt % based on the total weight of the reaction mixture.

The reaction mixture was cast between two polypropylene molds and cured under visible light to fabricate a silicone hydrogel contact lens. The silicone hydrogel contact lens was then dry-released from molds.

After extracted with isopropanol, washed with aqueous solution, the silicone hydrogel contact lens was placed in blister package filled with borate buffered saline and sterilized.

With this manufacturing process, the silicone hydrogel contact lens had a water content fell in a range of 46-54%. According to various embodiments of the present disclosure, a silicone hydrogel contact lens had a water content of 48%, an oxygen permeability of 101 DK and modulus of 0.73 MPa was identified and explored further for other key properties.

Embodiment 2

UV Transmittance Measurement of a Silicone Hydrogel Contact Lens

The UV transmittance measurement of the silicone hydrogel contact lens was performed by using a Cary 50 UV-VIS Spectrophotometer. The silicone hydrogel contact lens with average center thickness of 80 micron was mounted properly in a cuvette filled with borate buffered saline.

The UVA and UVB transmittances of silicone hydrogel contact lenses of embodiment 1 were listed in Table 1.

| Samples of embodiment 1 | UVA transmittance (%, 316~380 nm) | UVB transmittance (%, 280~315 nm) |
| --- | --- | --- |
| blank control | 99.9396 | 99.9793 |
| 1 | 9.5479 | 0.4410 |
| 2 | 9.8501 | 0.6061 |
| 3 | 7.4469 | 0.1247 |
| 4 | 5.6050 | 0.0234 |
| 5 | 5.8671 | 0.0232 |
| 6 | 8.3689 | 0.2289 |
| average | 7.7810 | 0.2412 |

In Table 1, the UVA and UVB average transmittances of silicone hydrogel contact lenses of embodiment 1 were individually 7.78% and 0.24%. This result meets Class I UV blocking capability as defined by US FDA.

Embodiment 3

Measurement of a Contact Angle Hysteresis of a Silicone Hydrogen Lens

Contact angle measurements were performed by using captive bubble method with detail described in the paper by M. Read, et, al "Dynamic contact angle analysis of silicone hydrogel lenses" in the Journal of Biomaterials Applications published online on 10 Mar. 2010. According to this method, a silicone hydrogel contact lens was properly clamped between two hard plastics such that the lens center portion was made relatively flat and then the lens was submerged into a small tank filled with borate buffered saline solution. A bubble was then properly introduced onto the lens surface and stayed on the surface. Picture was taken with a digital camera and then the left and right contact angles were obtained from drawing using a computer program, and the average of left and right contact angle was recorded.

Table 2 lists contact angle hysteresis from the silicone hydrogel contact lens of embodiment 1 and from commercially available silicone hydrogel lenses such as Senofilcon A, Narafilcon A, Galyfilcon A, Enfilcon A, Clariti (Somofilcon A) having UV-blocking efficiency (Class I and II).

| Contact lenses | Class | Curing method | FDA* approval number | Contact angle hysteresis |
|---|---|---|---|---|
| Embodiment 1 | I | photo-initiating | not yet | 9° |
| Senofilcon A | I | photo-initiating | K042275 | 13.3° |
| Narafilcon A | I | photo-initiating | K073485 | 14.9° |
| Galyfilcon A | I | photo-initiating | K032340 | 15.8° |
| Enfilcon A | II | heat-initiating | K071736 | 48.7° |
| Clariti (Somofilcon A) | II | heat-initiating | K130342 | 24.7° |

*FDA: US Food and Drug Administration

It is well accepted that when hysteresis is about 15° or lower, the hydrogel lens surface wettability is considered excellent. In Table 2, the hysteresis for the contact lens of embodiment 1 (9°) is superior than those of all other commercially available contact lenses, and it belongs to the best group of surface wettable silicone hydrogel lenses with hysteresis about 15° or lower.

On one hand, other than embodiment I, photo-cured silicone hydrogel contact lenses have Class I UV blocking capability, and none of them has N-vinyl pyrrolidone in their compositions. The thermally cured silicone hydrogel contact lenses have Class II UV blocking capability, and they did not have good hysteresis (at 24-49°). It is reasonable to claim that the curing reaction for fabricating a silicone hydrogel contact lens by heat-initiating curing process may decrease the degree of surface wettability of the silicone hydrogel contact lens, so that the hysteresis is increased.

Embodiment 4

Measurement of Lipid Deposits

1. Saline and model lipid saline solutions were prepared. 10.8 g of NaCl was dissolved into 1200 ml de-ionized water to get 0.9% saline solution. 0.1 g of cholesterol (CAS 57-88-5) was dissolved into 10 g of ethanol, and then it was added into 1000 mL of 0.9% saline solution along with 1.5 g of sodium deoxycholate.
2. HPLC Calibration curve was provided. 0, 1, 2, 3, 4, and 5 ml of above solution was picked up, and they were diluted to 10 ml solution with 0.9% saline solution. After thorough mixing, they were injected into HPLC to establish a calibration curve.
3. Adsorption test was performed. 8 hydrated lenses were provided, and they were placed into glass vials filled with 2 ml of standard lipid solution, one in each vial. Filled glass vials were sealed and stored in an oven at 37° C. for 8 hours. After the above process, the hydrated lenses were soaked with 2 ml of 0.9% saline solution for 30 minutes. Then they were individually combined with the 4 ml solution and injected into HPLC. The difference in concentration between the standard lipid solution and the test solution was used to calculate the amount of lipid adsorbed into the lens.
4. Contact lens cleaned with MPS. Those tested contact lenses from step 3 were soaked in 2 ml of Biotrue MPS for 8 hours.
5. At the 7th, 14th, 21st and 30th days, the same tests were performed by repeating steps 3 and 4.
6. The difference between the contact lens absorptions for different test days against the $1^{st}$ day was the weight accumulated in the lens which cannot be removed from lens with Biotrue (i.e., permanent deposits). The total and residual lipid deposits from the silicone hydrogel contact lenses after various testing periods were listed in Table 3.

Embodiment 4

Measurement of Protein Deposits

1. Buffered saline and model protein solution were prepared. 10 g of NaCl, 7.7 g of $Na_2HPO_4.12H_2O$ and 0.634 g of $NaH_2PO_4.2H_2O$ were dissolved into 1200 ml deionized water to get buffered saline solution with pH 7.4 and osmotic pressure of 310 $mOsm/kgH_2O$. 1.9 g of lysozyme, 0.2 g bovine serum albumin and 0.1 g of γ-globulin were dissolved into 1000 mL of buffered saline prepare.
2. UV-absorption curve was provided. 0.1 ml, 0.3 ml, 0.5 ml, 0.7 ml, 0.9 ml, 1.0 ml, 1.2 ml, 1.5 ml and 2.0 ml of above protein solution were diluted with buffered saline to 10 ml solution. After thorough mixing, the UV absorption was measured at 280 nm.
3. Absorption tests were performed. 8 hydrated lenses were provided, and each of them was placed into a glass vial filled with 2 ml of standard protein solution individually. Filled glass vials were sealed and stored in an oven at 37° C. for 8 hours. After the above process, the lenses were individually soaked with 2 ml of 0.9% saline solution for 30 minutes, and then combined the 4 ml solution. The UV absorptions of the lenses were measured. The difference in concentration between the standard protein solution and the test solution was the amount of protein absorbed into the lens.
4. Contact lens cleaned with MPS. The tested lens from step 3 was soaked in 2 ml of Biotrue MPS for 8 hours.
5. At the 7th, 14th, 21st and 30th days, the tests were performed by repeating steps 3 and 4.
6. The difference between concentrations from UV absorptions of the contact lenses for different test day against the $1^{st}$ day was the weight accumulated in the lens which cannot be removed from lens with Biotrue (i.e., permanent deposits). The total and residual protein deposits from the silicone hydrogel contact lenses after various testing periods were listed in Table 3.

Table 3 lists the lipid deposits and protein deposits of the silicone hydrogel contact lenses.

| | days | Lipid deposits | | | Protein deposits | | |
|---|---|---|---|---|---|---|---|
| | | embodiment 1 | Senofilcon A | Comfilcon A | embodiment 1 | Senofilcon A | Comfilcon A |
| Total deposits in lens (μg/Lens) | $1^{st}$ day | 185.21 | 186.65 | 186.39 | 0.568 | 0.551 | 0.557 |
| | $7^{th}$ day | 184.05 | 185.47 | 183.33 | 0.525 | 0.521 | 0.53 |
| | $14^{th}$ day | 183.42 | 183.59 | 183.6 | 0.527 | 0.525 | 0.535 |
| | $21^{st}$ day | 183.69 | 183.61 | 182.93 | 0.526 | 0.522 | 0.534 |
| | $30^{th}$ day | 183.44 | 182.99 | 182.44 | 0.535 | 0.53 | 0.532 |
| Residual deposits in lens (μg/Lens) | $7^{th}$ day | 1.16 | 1.18 | 3.06 | 0.043 | 0.03 | 0.027 |
| | $14^{th}$ day | 1.79 | 3.06 | 2.79 | 0.041 | 0.026 | 0.022 |
| | $21^{st}$ day | 1.52 | 3.04 | 3.46 | 0.042 | 0.029 | 0.023 |
| | $30^{th}$ day | 1.77 | 3.66 | 3.95 | 0.033 | 0.021 | 0.025 |

In Table 3, the total lipid deposit of the silicone hydrogel contact lens of the present disclosure at the $1^{st}$ day was 185.2 μg/lens, which was similar to the total lipid deposits of the commercially available contact lenses, Senofilcon A and Comfilcon A. However, after repeating the MPS cleaning processes and redeposition tests, the residual lipid deposit of the silicone hydrogel contact lens of the present disclosure at the $30^{th}$ day is 1.77 μg/lens, which is significantly lower than the commercially available contact lenses, Senofilcon A (3.95 μg/lens) and Comfilcon A (3.66 μg/lens). Accordingly, compared to the commercially available contact lenses, Senofilcon A and Comfilcon A, the silicone hydrogel contact lens of the present disclosure has better hydrophilicity.

Table 3 showed all three lenses, Senofilcon A, Comfilcon A and a silicone hydrogel contact lens of the present disclosure had significantly fewer protein deposits (0.568 μg/lens), which showed that silicone hydrogel contact lenses had a very significant anti-protein-deposition efficiency. On another hand, the residual protein deposit of the silicone hydrogel contact lens of the present disclosure at the $30^{th}$ day was 0.033 μg/lens, which was higher than the commercially available contact lenses, Senofilcon A (0.21 μg/lens) and Comfilcon A (0.25 μg/lens). Therefore, compared to the commercially available contact lenses, Senofilcon A and Comfilcon A, the silicone hydrogel contact lens of the present disclosure has better hydrophilicity.

In various embodiments of the present disclosure, the UVA (380-316 nm) transmittance of the silicone hydrogel contact lens was less than 10%, and the UVB (315-285 nm) transmittance of the silicone hydrogel contact lens was less than 1%, which met Class I UV blocking contact lens capability as defined by US FDA.

On another hand, because the silicone hydrogel contact lens is a hydrophobic contact lens in nature, the silicone hydrogel contact lens is easy to adsorb lipids, so as to cause blurred vision or discomfort when wearing. The silicone hydrogel contact lens of the present disclosure includes hydrophilic side chains, polar functional groups or a combination thereof, so that compared to the commercially available contact lenses, the silicone hydrogel contact lens of the present disclosure has better hydrophilicity and wettability to efficiently prevent lipid and protein depositions.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An UV-blocking silicone hydrogel composition, comprising:

a hydrophilic silicone macromer in the amount of 25 to 55 weight percentage (wt %) based on the total weight of the silicone hydrogel composition, and having a structure of chemical formula (2):

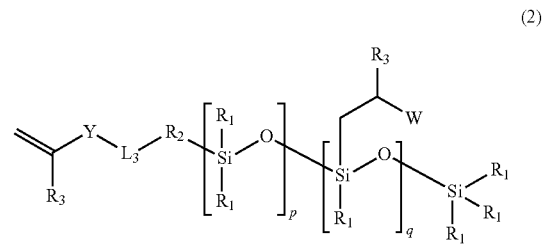

(2)

wherein $R_1$ is a C1-C12 alkyl group, $R_2$ is $-(CH_2)_b-O-(CH_2)_c$ or a C3-C6 alkyl group, wherein b is an integer of 2-4, and c is an integer of 2-4, $R_3$ is hydrogen or methyl group, W is

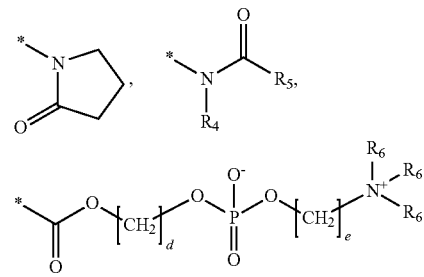

or $*-CH_2O(CH_2CH_2O)_f-CH_2CH_2OCH_3$, wherein $R_4$ is a C1-C4 alkyl group, $R_5$ is a C1-C2 alkyl group, $R_6$ is a C1-C3 alkyl group, d is an integer of 2-4, e is an integer of 2-4, f is an integer of 1-20, and * is a linkage position of W in the chemical formula (2), Y is $-(CH_2)_g-$ or $-COO(CH_2)_h$, wherein g is an integer of 0-4, and h is an integer of 2-4, $L_3$ a covalent bond directly linking between Y and $R_2$, p is an integer of 10-50, and q is an integer of 1-25;

an UV-blocking monomer in the amount of 0.5 to 2 wt % based on the total weight of the silicone hydrogel composition;

a first hydrophilic monomer in the amount of 30 to 60 wt % based on the total weight of the silicone hydrogel composition;

a crosslinker in the amount of 0.2 to 2 wt % based on the total weight of the silicone hydrogel composition; and a polymerization initiator in the amount of 0.2 to 1 wt % based on the total weight of the silicone hydrogel composition.

2. The silicone hydrogel composition of claim 1, wherein the ethylenically-based polymerizable group of the hydrophilic silicone macromer is selected from the group consisting of ethylenically-based acrylate, ethylenically-based methacrylate, ethylenically-based acrylamide, ethylenically-based methacrylamide, ethylenically-based styrene, ethylenically-based vinylcarbamate and a combination thereof.

3. The silicone hydrogel composition of claim 1, wherein the linker of the hydrophilic silicone macromer has a main chain and a side chain, and the main chain, the side chain or the both include a polar functional group.

4. The silicone hydrogel composition of claim 3, wherein the polar functional group of the hydrophilic silicone macromer is selected from the group consisting of hydroxyl, amide, carbamate and urea.

5. The silicone hydrogel composition of claim 1, wherein the UV-blocking monomer is a benzophenone-based monomer, a benzotriazole-based monomer, a 2-hydroxyphenyl-s-triazine-based monomer or a combination thereof.

6. The silicone hydrogel composition of claim 5, wherein the benzophenone-based monomer comprises 4-methacryloxy-2-hydroxy benzophenone, 4-(2-acryloxyethoxy-2-hydroxy benzophenone or a combination thereof.

7. The silicone hydrogel composition of claim 5, wherein the benzotriazole-based monomer is selected from the group consisting of 2-(2-hydroxy-5-methacryloxyethylphenyl)-2H-benzotriazole, 2-(2-hydroxy-5-methacryloxyethylphenyl)-2H-6-chloro-benzotriazole, 2-(2-hydroxy-5-methacryloxyethylphenyl)-2H-6-methoxybenzotriazole, 2-[3'-t-butyl-5'-(3'-dimethylvinylsilylpropoxy)-2'-hydroxyphenyl]-5-methoxybenzotriazole, 2-[3'-t-butyl-5'-(3'-methacryloylozypropyl)phenyl]-5-chlorobenzotriazole, 2-[2'-hydroxy-5'-(□-methacryloyloxypropoxy)-3'-tert-butylphenyl]-5-methoxy-2H-benzotriazole and a combination thereof.

8. The silicone hydrogel composition of claim 1, wherein the 2-hydroxyphenyl-s-triazine-based monomer comprises 4-methacryloxyethyl-2-hydroxyphenyl-s-triazine, 4-acryloxyethyl-2-hydroxyphenyl-s-triazine or a combination thereof.

9. The silicone hydrogel composition of claim 1, wherein the first hydrophilic monomer comprises N-vinyl pyrrolidone (NVP).

10. The silicone hydrogel composition of claim 1, wherein the crosslinker is selected from the group consisting of ethylene glycol dimethacrylate, diethylene glycol dimethacrylate, triethylene glycol dimethacrylate, tetraethylene glycol dimethacrylate, ally dimethacrylate, ethylene glycol dially ether, triethylene glycol dially ether, tetraethylene glycol dially ether, triallyl-s-triazine-2,4,6(1H,3H,5H)-trione and a combination thereof.

11. The silicone hydrogel composition of claim 1, wherein the polymerization initiator is a photoinitiator.

12. The silicone hydrogel composition of claim 11, wherein the photoinitiator is a phosphine-oxide-based initiator, titanium metallocene-based initiator or a combination thereof.

13. The silicone hydrogel composition of claim 12, wherein the phosphine-oxide-based initiator is selected from the group consisting of diphenyl (2,4,6-triphenyl)phosphine oxide, bis(2,4,6-trimethylbenzoyl)phenyl phosphine oxide, bis(2,6-dimethoxybenzoyl)(2,4,4-trimethylpentyl)phosphine oxide and a combination thereof.

14. The silicone hydrogel composition of claim 12, wherein the titanium metallocene-based initiator comprises dicyclopentadienyl bis[2,4-difluoro-3-(1-pyrrolyl)phenyl]titanium.

15. The silicone hydrogel composition of claim 1, further comprising a siloxane monomer in the amount of 5 to 25 wt % based on the total weight of the silicone hydrogel composition.

16. The silicone hydrogel composition of claim 15, wherein the siloxane monomer comprises 3-methacryloxy-2-hydroxy) propyl-bis(trimethyl-siloxy) methylsilane, 3-methacryloxy-2-hydroxypropoxy) propyl-bis(trimethyl-siloxy) methylsilane or a combination thereof.

17. The silicone hydrogel composition of claim 1, further comprising a second hydrophilic monomer in the amount of 5 to 15 wt % based on the total weight of the silicone hydrogel composition.

18. The silicone hydrogel composition of claim 17, wherein the second hydrophilic monomer is selected from the group consisting of 2-hydroxyethyl methacrylate, glyceryl methacrylate, methacrylic acid, acrylic acid, N,N-dimethyl acrylamide, N,N-dimethyl methacrylamide, N-vinyl-N-methyl acetamide and a combination thereof.

19. An UV-blocking silicone hydrogel contact lens, comprising:

a contact lens body composed of the silicone hydrogel composition of claim 1.

20. The silicone hydrogel lens of claim 19, wherein an UVA (380-316 nm) transmittance of the contact lens body is less than 10%, and an UVB (315-285 nm) transmittance of the contact lens body is less than 1%.

* * * * *